May 5, 1970 W. E. MEINKE 3,509,635
APPARATUS FOR MEASURING AND INSPECTING ARTICLES OF MANUFACTURE
Filed July 21, 1966 7 Sheets-Sheet 1

INVENTOR.
WILBUR E. MEINKE
BY Hoffmann and Young
ATTORNEYS

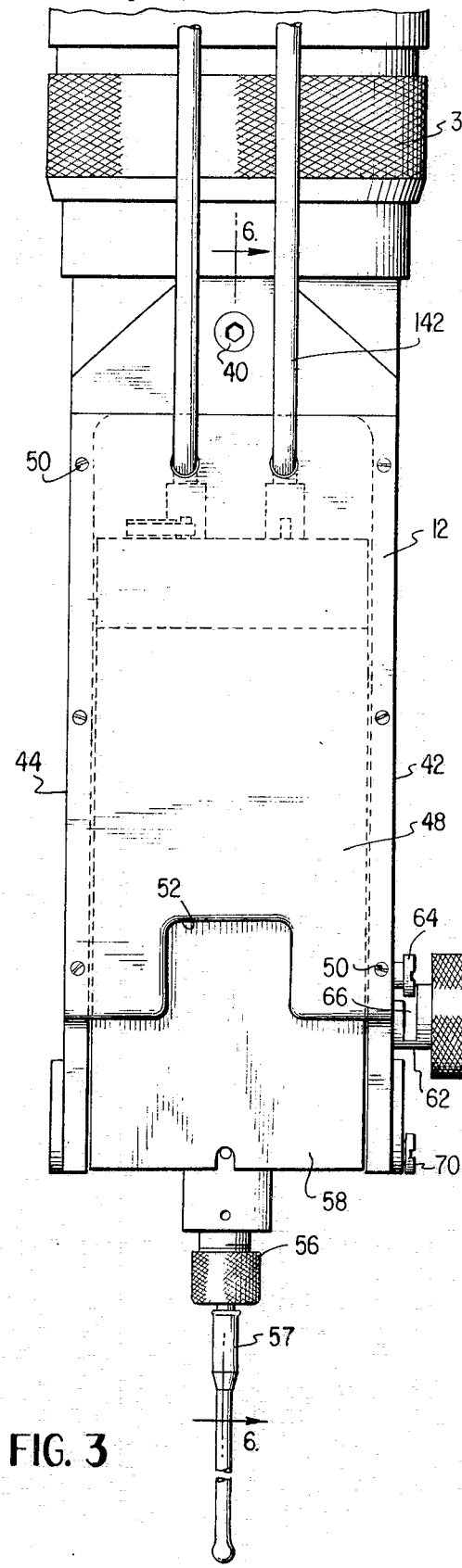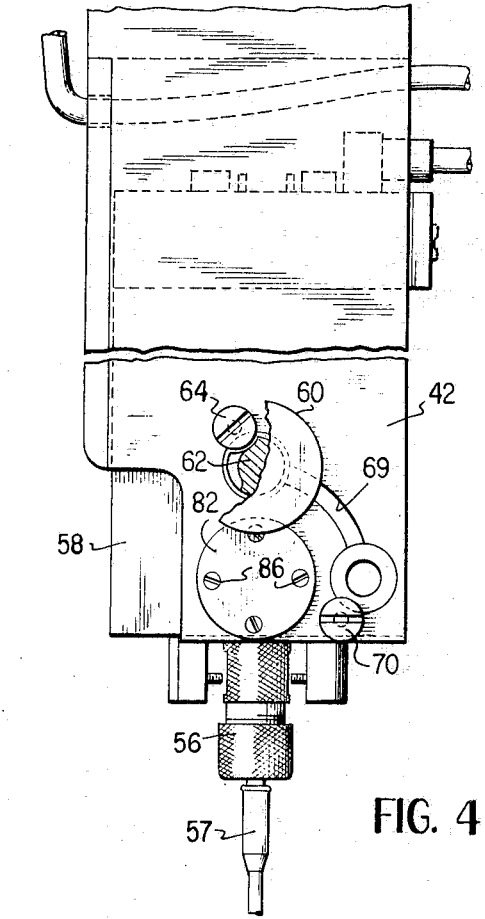
FIG. 4
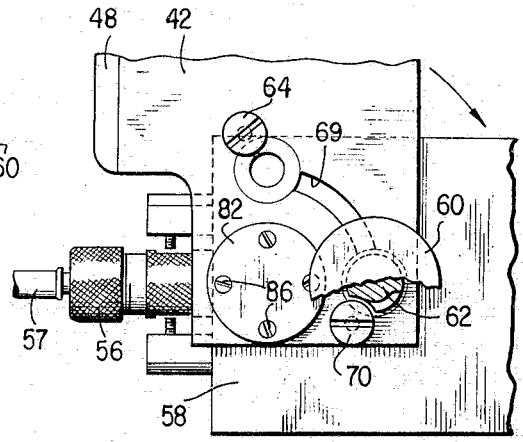
FIG. 5
FIG. 3
INVENTOR
WILBUR E. MEINKE
BY Hoffman & Yount
ATTORNEYS.

INVENTOR
WILBUR E. MEINKE
Hoffman & Yount
ATTORNEYS

May 5, 1970 W. E. MEINKE 3,509,635
APPARATUS FOR MEASURING AND INSPECTING ARTICLES OF MANUFACTURE
Filed July 21, 1966 7 Sheets-Sheet 5

INVENTOR
WILBUR E. MEINKE

BY Hoffman & Yount

ATTORNEYS.

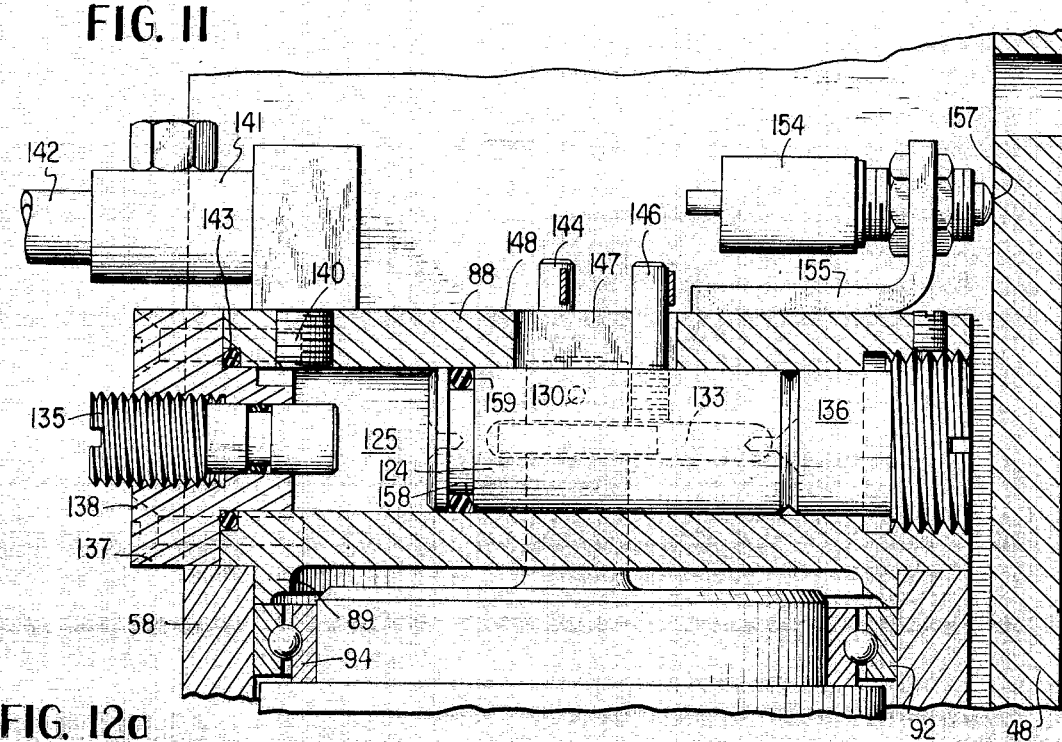
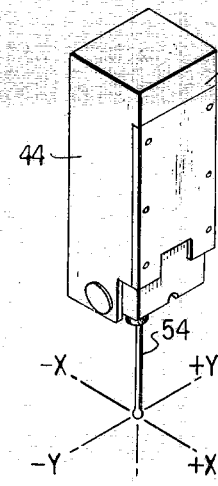
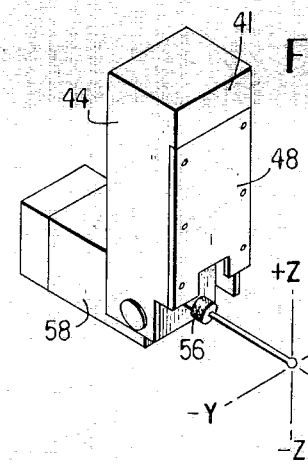
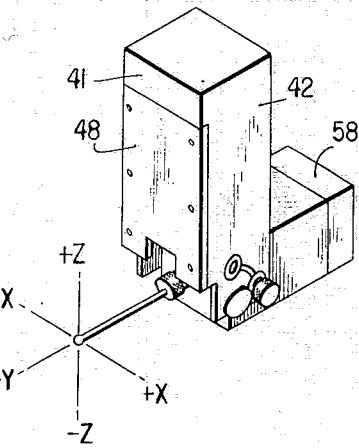
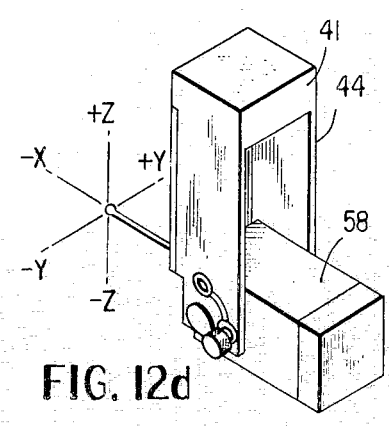
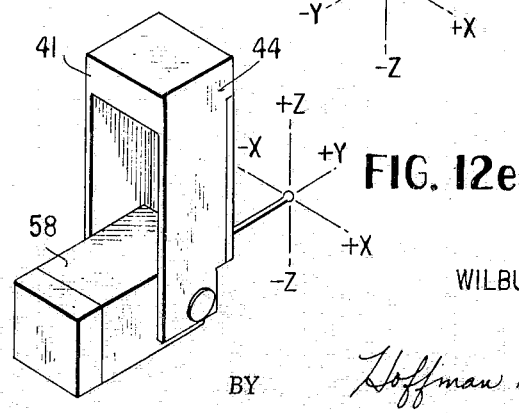

United States Patent Office 3,509,635
Patented May 5, 1970

3,509,635
APPARATUS FOR MEASURING AND INSPECTING ARTICLES OF MANUFACTURE
Wilbur E. Meinke, Fairview Park, Ohio, assignor to The New Britain Machine Company, Cleveland, Ohio, a corporation of Ohio
Filed July 21, 1966, Ser. No. 572,634
Int. Cl. G01b 7/28
U.S. Cl. 33—174
3 Claims

ABSTRACT OF THE DISCLOSURE

In a numerically controlled measuring and inspection apparatus, a probe head movable in a system of coordinate axes and including a probe holder assembly mounted for rotational and pivotal movement, a probe member carried by the probe holder assembly, and signal generator means actuated by pivotal movement of the probe holder assembly and probe member.

---

The present invention relates to an apparatus or machine for measuring and inspecting articles of manufacture, and in particular to a novel probe head for use in such an apparatus.

An object of the present invention is to provide a new and improved numerically controlled measuring and inspection apparatus for measuring and inspecting articles of manufacture and which is extremely accurate and reliable in operation and which has a probe head which is positionable in two axes of a coordinate system relative to the article to be inspected or measured either automatically or semi-automatically or manually and is probeable along a third axis in the coordinate system either semi-automatically or manually.

Another object of the present invention is to provide a new and improved hydraulically powered, numerically controlled apparatus for measuring and inspecting articles of manufacture and which has a probe head which is automatically positionable in three axes relative to an article of manufacture and which is manually probeable in a fourth axis to determine deviations in the dimensions of the article from standard specifications.

A further object of the present invention is to provide a new and improved probe head for use in a numerically controlled measuring and inspection apparatus which is of a highly practical compact, and reliable construction and which is so constructed and arranged that it is capable of being oriented in a plurality of, and preferably five, attitudes for inspecting and measuring articles of manufacture.

A still further object of the present invention is to provide a new and improved probe head of the character referred to and which is capable of rapidly determining the center of a hole.

A still further object of the present invention is to provide a new and improved probe head of the character referred to which includes a probe which is deflectable or movable relative to the probe head upon engaging an article to be measured and a signal generating means for indicating the null position of the probe upon the latter being moved into engagement with an article of manufacture and for generating a signal to stop further movement of the probe head.

The present invention also resides in certain novel constructions and arrangement of parts of the probe head and the manner in which the probe head is oriented in different attitudes, rotated, etc., and further objects and advantages will appear from the following detailed description of the preferred embodiment described with reference to the accompanying drawings, which form a part of the present specification and in which like reference characters designate corresponding parts throughout the several views and wherein:

FIG. 3 is an enlarged front elevational view of a part of the apparatus shown in FIGS. 1 and 2;

FIG. 4 is a fragmentary rightside elevational view of the part shown in FIG. 3;

FIG. 5 is a fragmentary rightside elevational view of the part shown in FIG. 3 with certain parts oriented in a different attitude;

Figure 8:
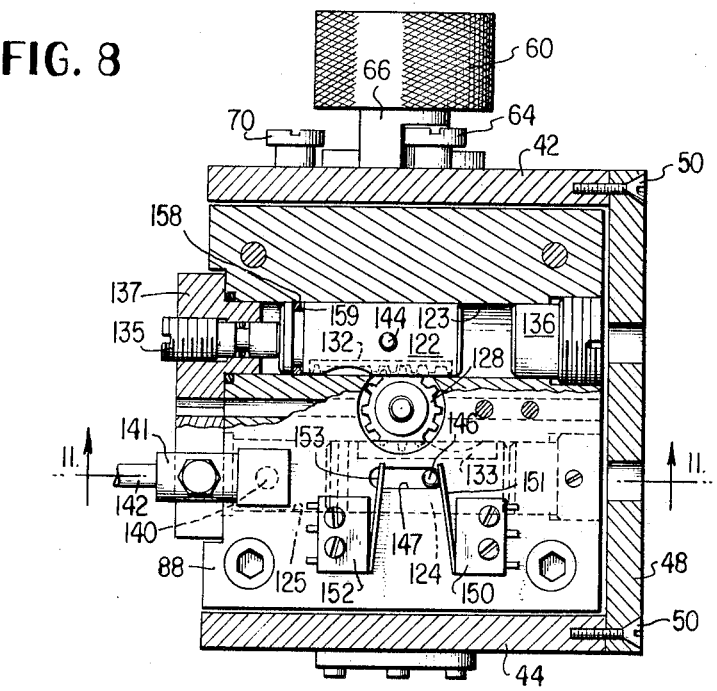
FIG. 8 is a sectional view taken approximately along the line 8—8 of FIG. 6.

FIG. 11 is a vertical sectional view with portions shown in elevation taken approximately along the line 11—11 of FIG. 8; and FIGS. 12a through 12e are perspective views showing the part shown in FIGS. 3 and 5 in alternative probing attitudes.

As representing one embodiment of the present invention, the drawings show a measuring and inspection apparatus or machine 10. The inspection and measuring machine 10 comprises a base 11 having a plurality of spaced, longitudinally extending, upwardly facing ways 12 thereon. Slidably supported on the ways 12 for linear movement in opposite directions longitudinally therealong is a column or gantry 13. The column 13 has a pair of horizontally extending rails 14 for supporting a saddle 15 for horizontal linear movement in opposite directions therealong and in a direction perpendicular to the movement of the column 13. The saddle 15 has vertically extending ways (not shown) and supports a probe head carrier or support 16, for vertical linear movement in opposite directions along the ways, the vertical movement of the carrier 16 being in a direction perpendicular to the directions of movement of the saddle 15 and the column 13. The probe head carrier 16 includes a downwardly extending spindle means 18 for supporting a novel probe head assembly 20 which is adapted to be removably secured thereto.

The inspection and measuring machine 10 further includes a work support table 22 for supporting an article of manufacture or work piece W which is to be measured and/or inspected. The work table 22, in the preferred embodiment, includes a rotary turntable 24 to enable the article of manufacture W to be rotated and dimensionally checked in a system of circular coordinates, as will hereinafter become more fully apparent.

The probe head 20 of the apparatus 10, in the illustrated embodiment, is moved in a first direction by moving the column 13 along the ways 12, which movement will arbitrarily be designated as movement along the x-axis in a Cartesian Coordinate System; a second direction perpendicular to the first direction by moving the saddle 15 along the rails 14, which movement will be arbitrarily designated as movement in the Y direction in the coordinate system; and in a third direction by moving the probe head carrier 16 along the ways on the saddle 15, which movement will be arbitrarily designated as travel in the Z direction in the coordinate system. Also, the article is adapted to be rotated by rotating the rotary turntable 24 about a vertical axis, which axis is designated the c-axis of a circular coordinate system. The machine 10, in the preferred embodiment, has a maximum travel in the X direction of 132 inches, in the Y direction of 72 inches and in the Z direction of 33¾ inches. In addition, the rotary turntable 24 has a diameter of 48 inches.

The column 13 is adapted to be moved in opposite directions along the ways 12 of the bed 11 by a conventional or suitable double acting hydraulic cylinder (not shown) operatively connected therewith and carried by the bed 11. Alternately, a lead screw having its opposite ends rotatably supported by the bed 11 and which is in threaded engagement with a nut on the underside of the column 13 and which is adapted to be rotated in opposite directions by a suitable reversible hydraulic motor, could be employed. The saddle 15 and the probe head carrier 16 are adapted to be respectively moved in opposite directions along the rails 14 and the ways on the saddle 15 by conventional or suitable double acting hydraulic cylinders 25 and 26 operatively connected therewith and carried by the column 13 and the saddle 15. The rotary turntable 24 is adapted to be rotated in opposite directions by a suitable or conventional reversible hydraulic motor (not shown) operatively connected therewith via a worm and gear drive.

Actuation of the aforementioned hydraulic cylinders to effectuate movement of the column 13, saddle 15 and probe head carrier to respectively move and position the probe head 20 along the X, Y and Z axes and/or the hydraulic motor to rotate the turntable 24 to rotate the workpiece W about the c-axis are adapted to be controlled by a numerical control system via closed loop servo systems. The numerical control system may be any suitable automatic or semi-automatic numerical control system under the command of an input media, such as punched tape or the like. Alternately, the machine could be mated to and controlled by either a general or special purpose computer. Since the numerical control system does not per se form a part of the present invention, it will not be described in detail and will only be generally described to the extent necessary for one skilled in the art to understand the operation of the machine 10.

Suffice it to say that the numerical control system includes a numerical control director 32 which is here shown as being of the taped controlled type. A control console 34 is provided for monitoring the operation of the machine 10 and as is the usual practice in the art is also provided with controls for overriding and controlling automatic programs. The control console 34 provides power on-off functions, tape advanced functions, manual input functions for each of the four axes utilized, as well as correction input data, read out lights, and the usual other control functions in the automated art. The position of the probe head 20, in the X, Y, and Z axes is indicated and fed back to the control console 34 via linear transducers located along the ways 12, rails 14 and the ways on the saddle 15, respectively. In a like manner, when the rotary turntable 24 is employed, rotary transducers are utilized to locate the position and provide a feed back signal indicating the position of the turntable relative to the c-axis.

In addition, a Flexo-Writer (registered trade name) 36 preferably is provided to print out and/or punch out the operation number or function being performed by the machine, the nominal dimensions, i.e., the specified dimensions of the article, the measured dimensions, i.e., the actual dimensions of the article, and a number indicating the deviation of the measured dimensions from the nominal dimensions.

When it is desired to measure and inspect a manufactured article to see if it is within the tolerance limitations established for that article, the numerical control director programs the probe head 20 to a predetermined reference point in two of the three axes of the coordinate system relative to the table 22. This predetermined reference point relative to the table 22 will be arbitrarily designated as a zero reference point. The probe head 20 is then moved along the remaining axis either semiautomatically or manually until the probe of the probe head engages the article and an electric signal generating means in the probe head 20 responsive to movement of the probe relative to the probe head nulls out and generates a signal to stop movement of the probe head, and in a manner hereinafter more fully described. The position of the probe of the probe head is fed back to the numerical control system which then automatically compare the actual distance of the probe relative to the table 22 and what the distance should be if the part had been perfectly manufactured and prints out the deviation, if any. Alternatively the operator can read and print out and compare the measured distance to the allowable tolerance with the purpose of accepting or rejecting the article of manufacture.

If the dimensions of an article to be measured are unknown, the probe head 20 is positioned semiautomatically in two of the three axes in the coordinate system in a reference point arbitrarily designated and then semiautomatically or manually probed along the third or remaining axis. In either type of operation, the distance the probe head moves upon engaging the article before it nulls out is indicated by an electrical analogue and transmitted back to the numerical control system for conversion and use.

As a result of using a zero reference on the table 22 or the turntable 24 all measurements made by the probing head 20 are relative to the zero reference, i.e. all points are measured from the zero reference point and are not relative to each other. In this manner the problem of cumulative error is avoided. The measuring apparatus is extremely accurate in operation and has a total error of one half mil with a repeatability factor of plus or minus one-tenth of a mil. In a circular coordinate system the total error is plus or minus 6 seconds of an arc with a repeatability factor of plus or minus 3 seconds of an arc.

The control system is designed to increment the probe head 20 in steps of one-tenth of a mil and has an electrical accuracy in the Cartesian Coordinate System of plus or minus five one-hundredths of one half mil. When a circular coordinate system is utilized, the incrementing is the same with an electrical accuracy on the c-axis of plus or minus 2 seconds of arc. The accuracies realizable from the probe head 20 are due to its unique construction and due to the fact that it is capable of being utilized with a numerical control system.

The novel probe head 20 is shown here as being mounted to a downwardly extending spindle assembly 18 comprising part of the probe head carrier 16. The probe head 20 is detachably connected to a spindle contained within the assembly 18 by a taper pin 40.

The probe head 20, in the preferred embodiment, comprises a generally rectangularly shaped housing 41 having side walls 42 and 44, and a removable front wall 48 which is attached to the side walls 42 and 44 by any suitable means, such as by machine screws 50. The front wall 48 is centrally cut out at its lower end, as indicated by reference numeral 52 and for reasons which will hereinafter become more fully apparent.

The probe head 20 further comprises a probe holder assembly 56 for holding a probe 57. The probe holder assembly 56 is supported by a pivot block 58 which in turn is rotatably supported by the side walls 42 and 44. The cutout 52 is provided so that the pivot block 58 and probe 57 can be rotated through an arc of 90° from a position in which the probe is vertically disposed, as shown in FIG. 4, to a position in which the probe 57 is horizontally disposed, as shown in FIG. 5.

Figure 7:
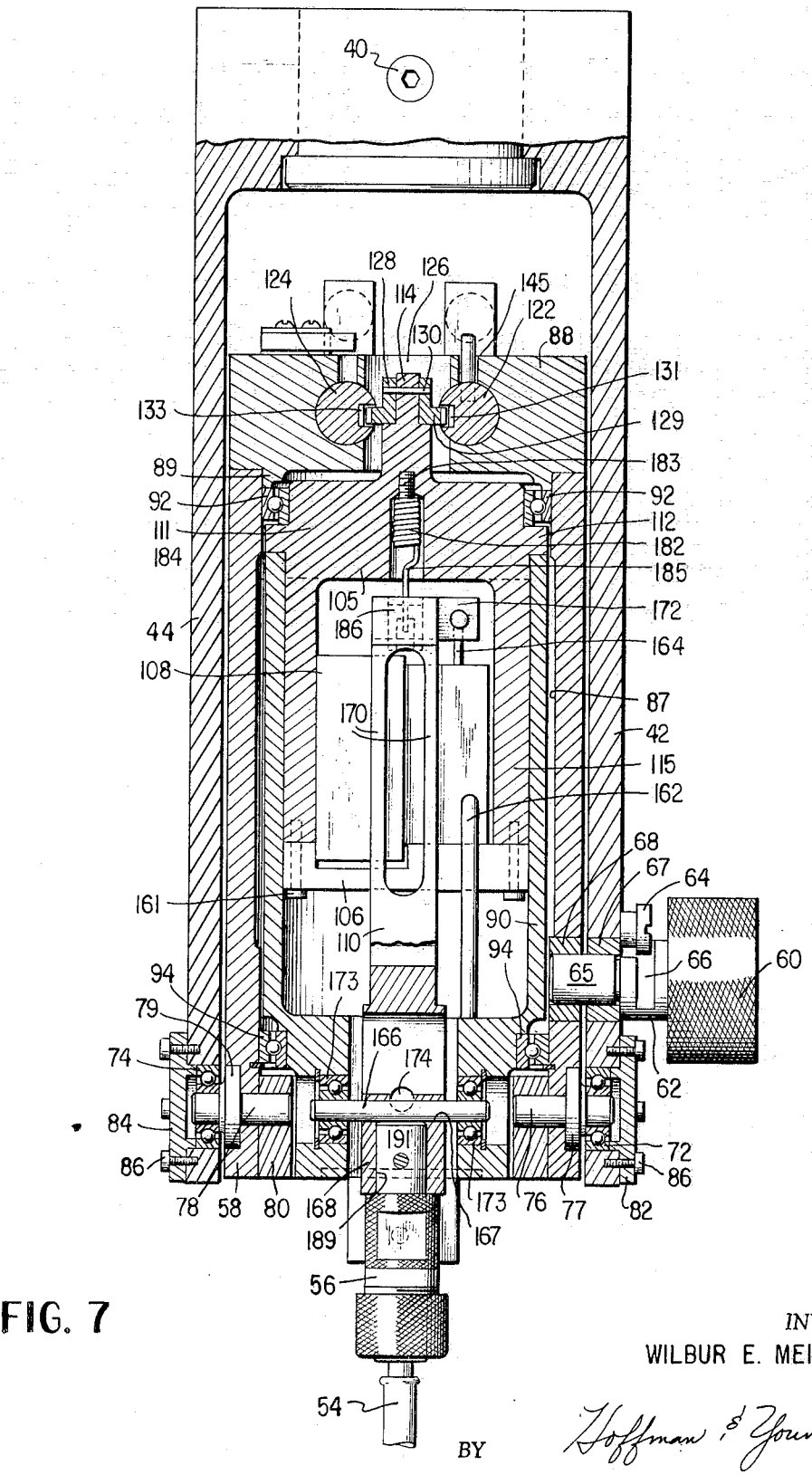
FIG. 7 is a sectional view with portions shown in elevation taken approximately along the line 7—7 of FIG. 6.

The pivot block 58 is adapted to be locked in a vertical attitude as shown in FIGS. 3 and 4, by a lock bolt 60 having a shaft 62 provided with a slot 66 for engaging a stop screw 64. Slot 66 is offset from the center line of the shaft 62 so that when the lock bolt 60 is rotated clockwise, the slot describes a path which is eccentric to the shaft 62 with the sides of the slot frictionally engaging the stop screw 64, as best shown in FIGS. 4, 5 and 7. The shaft 62 at its inner end 65 is received in an arcuately extending bushing 67 fixed in the side wall 42 and in a bushing 68 fixed within the pivot block 58. The arcuately extending bushing 67 defines an arcuately extending slot 69 in the side wall 42.

The provision of the slot 69, which extends through an arc of 90°, enables the probe assembly 56 and pivot block 58 to be rotated about a horizontal axis from the position shown in FIG. 4 in which the probe is in a vertical attitude to the position shown in FIG. 5 in which the probe 57 is in a horizontal attitude.

A second stop screw 70 is provided below and to the left of the slot 69, and thus, when it is desired to orient the probe 57 in a horizontal attitude, it is only necessary to disengage the lock bolt 60 by rotating it counterclockwise, as viewed in FIG. 4, and then manually rotate the probe assembly 56 until it assumes the attitude shown in FIG. 5. The probe assembly 56 can then be locked in this position by rotating the lock bolt 60 in a clockwise direction until the sides of the slot 66 engage the stop screw 70.

The pivot block 58 is rotatably supported by the side walls 42 and 44 of the probe head assembly 20. To this end, the side walls 42 and 44 respectively carry bearing means 72 and 74, as best shown in FIG. 7, and the pivot block 58 is provided with a pair of laterally extending shafts 76, 78 which are received within and supported by the inner races of the bearings 72 and 74. Ready access may be had to the bearing means 72, 74 through cover plates 82, 84 mounted on the side walls 42, 44, respectively, and are retained thereon by suitable means, such as screws 86. It should be apparent from the foregoing that the pivot block 58 is rotatable about the axis of the shafts 76, 78 to move the probe 57 between a vertical position, as shown in FIG. 4, to a horizontal position as shown in FIG. 5, or vice versa.

The pivot shafts 76, 78 are also used to lock a ring member 80 within a longitudinally extending cylindrical bore or opening 87 within the pivot block 58. The ring 80 as best shown in FIG. 7, is provided with openings for receiving the innermost ends of the shafts 76, 78.

The pivot block 58 as well as all other metallic parts used in the construction of the probe head assembly 20 may be machined from a light durable metal, such as aluminum. The pivot block is rectangular in shape and is provided with the cylindrical bore 87 within which the ring 80 is mounted. The ring 80 is used for the purpose of reducing the diameter of the bore 87 at the lower end of the pivot block 58, as viewed in FIG. 7. The pivot block 58 provides a support means for the mechanical and electrical parts of the probe head 20. As is best seen in FIG. 7, a reaction block 88 is fixed to and supported on the upper surface of the pivot block 58. The reaction block 88 is provided with an annular flange 89 which extends into the bore 87 of the pivot block 58 and serves a purpose to be hereinafter described.

A gauge head housing 90 is rotatably supported within the bore 87 of the pivot block 58 via upper and lower ball bearing means 92 and 94. The bearing means 92 and 94 have the outer raceways mounted on the pivot block with inner raceways being mounted on and supported by a gauge head housing 90. The flange 89 abuts on the outer raceway of the bearing means 92. The gauge head housing 90 comprises a hollow right circular cylinder having a reduced inside diameter at the probe end of the probe head 20. The housing is open on both ends and it is rotatably supported within the bore 87 by the bearings 92 and 94.

Figure 6:
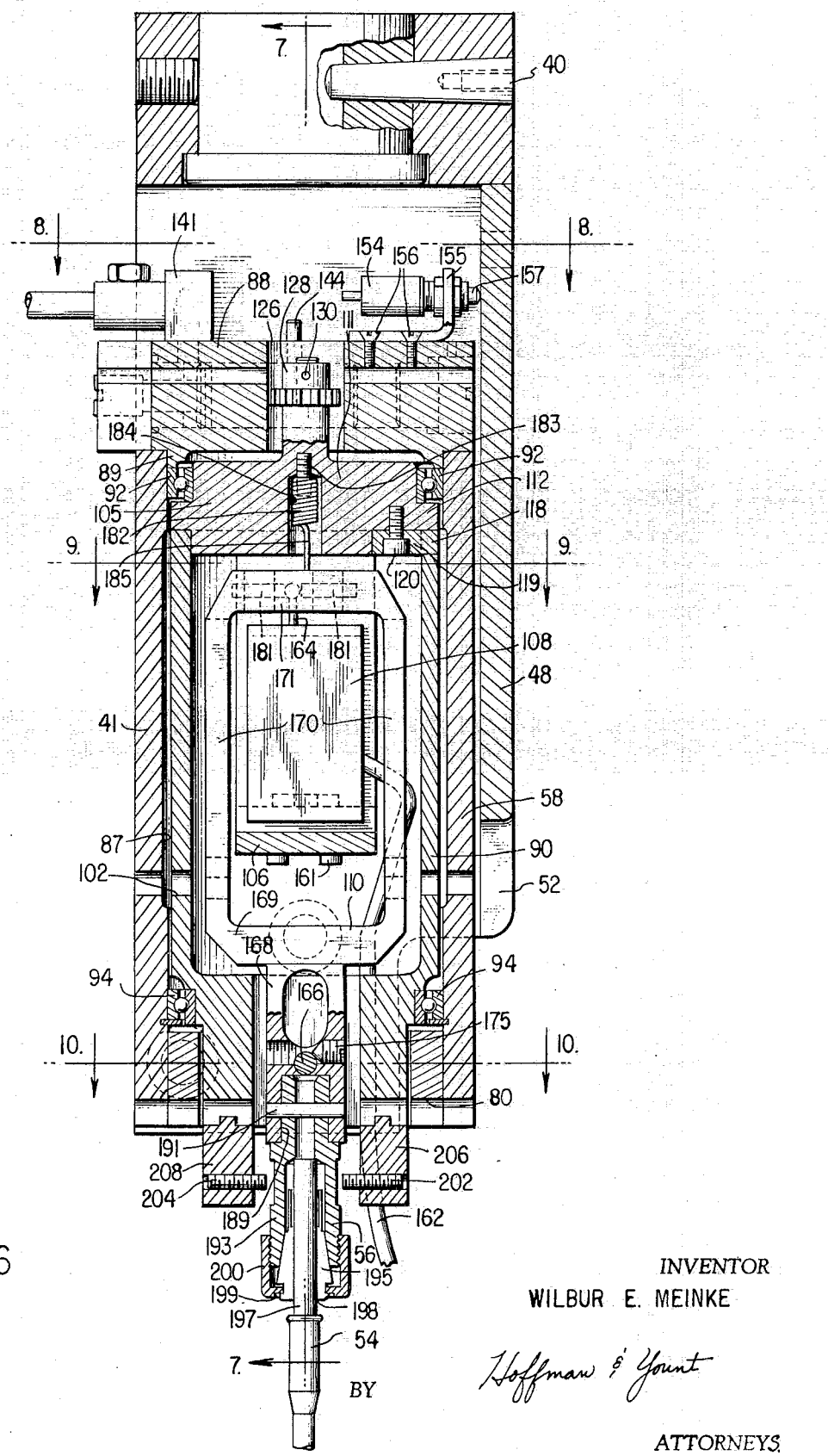
FIG. 6 is a sectional view with portions shown in elevation taken approximately along the line 6—6 of FIG. 3.
Figure 9:
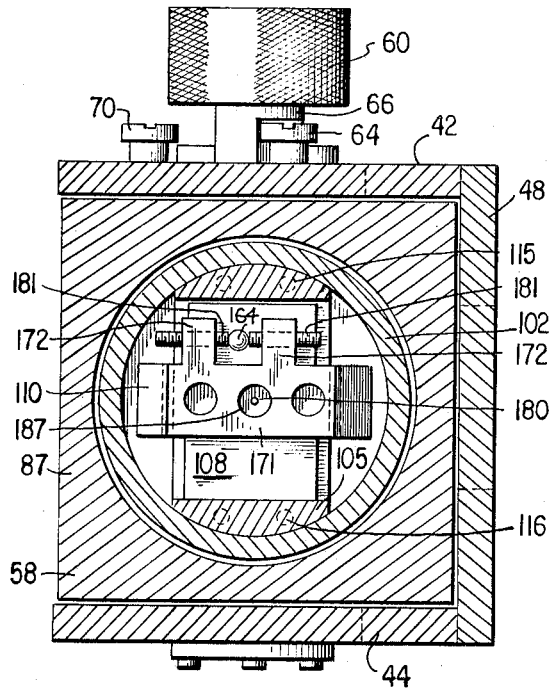
FIG. 9 is a sectional view taken approximately along line 9—9 of FIG. 6.
Figure 10:
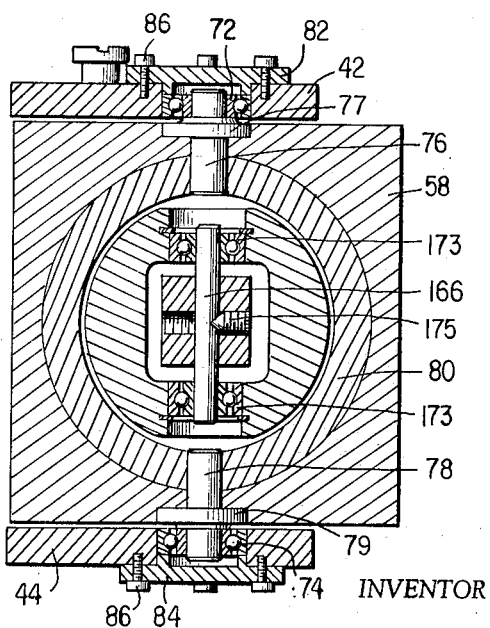
FIG. 10 is a sectional view taken approximately along line 10—10 of FIG. 6.

Referring to FIGS. 6, 7 and 9, the gauge head housing 90 serves as a supporting means for a gauge head assembly comprising a gauge mounting block 105, a gauge mounting block support 106, a gauge 108, a yoke member 110, and the probe assembly 56.

The gauge mounting block 105, hereinafter referred to as the gauge block 105, is mounted on the housing 90 and comprises a circular cap-like member having a solid cap portion 111 provided with an annular flange 112, a centrally located upwardly extending cylindrical post 114, and a pair of downwardly extending leg members 115, 116. Both the housing 90 at its upper end, see FIG. 6, and the gauge block 105 are provided with aligned keyways 118 for receiving a key 119 bolted to the underside of the cap portion 111. The key is used for leveling the gauge support relative to the housing 90. The cap portion of the gauge block 105 supports the inner raceway of the bearing means 92. It should be apparent from the foregoing description and the drawings that the housing 90 and the gauge block 105 constitute, with the parts supported by them, a rotatable assembly mounted within the bore 87 of the pivot block 58.

Referring to FIG. 7 or 11, the housing and gauge block are adapted to be rotated in precise increments of 90° through the cooperation of a pair of single acting hydraulically operated pistons 122, 124 slidably received in a pair of cylindrical passageways 123, 125 respectively located in the reaction block 88, and a pinion gear 128 mounted on the post 114 of the gauge block 105. The cylindrical passageways are 123, 125 and are closed at their opposite ends. The reaction block 88 is provided with a centrally disposed vertically extending cylindrical bore 126 through which the post 114 extends. The bore 126 extends vertically through a side portion of the passageways 123, 125, and the pinion gear 128 is fixed to the post 114 adjacent the open side portions of the passageways. In the preferred embodiment the upper half of post 114 is reduced to one half of the diameter of the lower half to provide a seating rim 129 for the pinion whereby the latter may be secured to the post by conventional means such as a dowel pin 130.

The pistons 122, 124 are respectively provided with horizontally disposed slots or grooves 131, 133 for seating a pair of toothed racks 132, 134 which are in meshed engagement with the pinion 128. It should be apparent from the foregoing that when the piston 124 is actuated toward the right, as viewed in FIG. 8, piston 122 is moved toward the left in response to the counterclockwise movement imparted to the pinion 128 by the rack 134 of the piston 124. Reverse movement is effected when piston 122 is actuated toward the right. In either case the linear movement of the pistons is converted to rotary movement for the housing 90 and gauge block 105.

Although it is evident that any degree of rotary movement could be imparted to the housing, the rotary movement in the preferred embodiment, is limited to precise increments of 90° through the use of a stop pin 135 and a plug 136 located at opposite ends of each of the passageways 123, 125 as seen in FIGS. 8 and 11. Referring to FIG. 11, it can be seen that the plug 136 is threadably secured to the reaction block 88 at one end of the passageway 125 and that the plug limits the movement of the piston 124 toward the right. In the preferred embodiment, the stop pin 135 is threadably mounted in a stop pin end cap 137 which in turn is bolted to the left side wall of the reaction block 88 by screws 138. Alternatively, the passageways 123, 125 of the reaction block 88 could be provided with threaded side walls to threadably receive the stop pins. However, end caps are preferably provided so that ready access may be had to the pistons and passageways to facilitate removal of parts and for cleaning.

Hydraulic fluid for operating the piston 124 enters the passageway 125 through a port 140 in communication with a valve 141 and a hydraulic fluid line 142. A seal between the reaction block and the plate member 137 is accomplished through the use of an O-ring 143. An identical hydraulic arrangement is provided for piston 122.

The pistons 122, 124 respectively support switch pins 144, 146 which are threadably mounted on the upper portion of each piston and which extend vertically through slots 145, 147 located in the top wall 148 of the reaction block 88. The slots 145, 147 extend longitudinally or axially of the passageways 123, 125. As best shown in FIG. 8, a pair of microswitches 150, 152 are mounted on and supported by the top wall 148 of the reaction block 88. The switches 150, 152 are respectively provided with actuator arms 151, 153 disposed at the opposite ends of the slot 147. The switches 150, 152 are operated by the pin 146. The switches are utilized to indicate the rotary orientation of the probe assembly to the computer or numerical control director.

An additional switch 154, see FIG. 6 or 11, is mounted on a switch plate 155 bolted to the top wall 148 of the reaction block 88, as by screws 156. Switch 154 is provided with a push button 157 adapted to engage the plate 148 when the probe is in the vertical position. It might be referred to as an interlock switch to indicate down or up position of the probe, that is, the vertical or horizontal attitudes by suitable panel displays at the numerical control or the like.

In order to prevent hydraulic fluid from leaking around the pistons 122, 124 and out of their respective pin slots 145, 147 each piston is provided with an annular groove 158 which receives a conventional sealing device such as the O-ring 159.

As previously mentioned, the gauge block 105 is provided with a pair of downwardly extending leg members 115, 116 as shown in FIGS. 7 and 9. These members 115, 116 have the shape of a vertical segment of a right circular cylinder where the curved portions of the legs frictionally engage the inner wall of the gauge head housing 90. The support 106 is mounted on the lower end of the legs by conventional means such as by screws 161. Both the support 106 and the legs 115, 116 may be drilled in line for the purpose of inserting dowel pins to prevent relative rotation between the mounting block and the gauge support 106.

The gauge support 106 is used to support the gauge head 108 which, in the preferred embodiment, comprises a linear voltage differential transformer. The head 108 is a purchased unit and does not per se form a part of the present invention. It is used as a null seeking device in that it is an easier matter to approach a null condition from some point on a sine curve than to try to maintain a precise null as the rest point. The gauge head is electrically energized through conductors carried in a cable 162 extending from the transformer, not shown, through the gauge head casing and out through a drilled hole in the gauge head housing 90. Electric signals produced by probing are also passed through the cable as well as switching signals carried to the head under the command of the numerical control director or computer. The head 108 may be switched for probing through an arc of 180° or that is in both directions along the probing axis.

The transformer is provided with a movable core which core is mechanically coupled to the probe assembly 56 through an operating arm 164 operated by the yoke 110 and probe assembly 56. The yoke 110 is used to support the probe assembly on one end for movement through an arc and is used on the other end for actuating the operating arm 164 by probe assembly movement. The yoke is a unitary member having a probe support member 168, a cross bar 169, a plurality of vertically extending legs 170, a second cross member 171 and a pair of projecting arms 172.

Yoke 110 is supported at its lower end 168 as viewed in FIG. 7, on a horizontally disposed precision shaft 166 having its opposite ends rotatably supported via bearings 173 by the gauge head housing 90. The shaft 166 extends through a transverse hole 167 drilled through the yoke at its lower end 168. The yoke 110 is rotatably supported by the gauge head housing 90 for movement about the axis of the shaft 166. In addition the yoke 110 is provided with a second tapped hole 174 slightly vertically displaced from the hole 167. The hole 174 lies in a horizontal plane, is perpendicular to hole 167 and intersects hole 167. A stop screw 175 having a conical point is threaded into hole 174 until the conical point engages the precision shaft 166 to provide a braking force on the shaft.

The legs 170 of yoke 110 extend vertically upwards in the gauge head housing 90 around the head 108 and terminate in the cross bar 171. The projecting arms 172 extend transversely of cross bar 171, as is best shown in FIG. 9 and bracket the operating arm 164 of the gauge head. Both projections 172 are provided with aligned tapped holes for supporting a pair of opposing threaded socket set screws 181. The screws 181 at their inner ends are in engagement with the operating arm 164 of the gauge head and convert movement of the yoke imparted to the latter by movement of the probe into linear movement of the transformer's moving core.

In order to keep the yoke 110 centered and thus the operating arm 164 precisely centered between the screws 181, a centering spring 182 is mounted on a socket set screw 183 where the latter is threadably retained in a cylindrical cavity 184 centrally located in the gauge block 105. The spring 182 is provided with an operating lever 185 extending into a centering bushing 186 which is supported in a hole 187 in the cross bar 171.

The support member 168 of the yoke 110 is provided with a cylindrical centrally located hole 189, as shown in FIGS. 6 and 7. The probe holder assembly 56 has a tool holder 193 provided with an upper cylindrical portion which is snugly received in the hole 189 and which is retained therein by a pin 191.

The tool holder 193 carries a contractable collet 195, for clampingly engaging an upper shaft portion 197 of the probe 57 and a nut 200 threadably engaged therewith for retaining the collet 195 within the holder 193 and for shifting the same axially thereof. The collet 195 and holder 193 have cooperating annular tapered surfaces so as to effect contraction of the collet when the latter is axially moved in an upward direction, as viewed in FIG. 6, by rotating the nut 200.

The probe 57 is here shown as being generally I-shaped, although the tip of the probe could be T-shaped or could be of any suitable or desired configuration. In the preferred embodiment, the probe 57 is made out of glass and is a replaceable item. Glass probes are used so that if, due to carelessness on the part of the operator or for other reasons, movement of the probe is continued past its nominal point relative to an article of manufacture being checked the probe will break before the yoke and other parts of the probe head are damaged.

As stated heretofore, the yoke 110 is supported for rotation around a shaft 166. As viewed in FIG. 6, movement of the yoke 110 and hence the probe 54 about the axis of the shaft 166 is limited by a pair of stop screws 202, 204 mounted in a pair of plates 206, 208 respectively. Plates 206, 208 are supported by the gauge head housing 90 and may be attached thereto by any conventional means such as screws or keys located in keyways.

The probe head 20 may be oriented in any of five basic probing attitudes with respect to the spindle 18 as shown in FIG. 12 of the drawings. In FIG. 12a of the drawings, the probe 57 is in a vertical attitude and positioned at a nominal or reference point in two axes, i.e., the Y and Z axes, of the coordinate system. The probe 57 will normally stay in this position due to the action of the centering spring 182 and in this attitude, the probe may move or rotate slightly about the pivot shaft 166 in the direction of the x-axis where the probe 57 will describe an arcuate path. The amount of rotary movement in the direction of the x-axis is limited by the stop screws 202, 204.

Assuming that an article of manufacture is to be measured along the x-axis from the reference point, the probe head is moved along the x-axis until the probe tip 57 touches the article. Movement is then slowly continued, causing the probe 57 to pivot about the shaft 166 which in turn causes the screws 181 carried by the yoke 110 to move the operating arm 164. Movement of the operating arm 164 causes movement of the transformer core in the probe head 20 and an electrical signal to be produced. The amount of movement and the direction of movement determine the characteristics of the signal generated by the gauge head 108, which signal is passed to the numerical control system and is processed after an analogue to digital conversion step. Movement of the probe 57 is continued until a null condition is reached at which time an electric signal is generated to stop movement of the probe head 20. The position of the probe 57 along the x-axis relative to the table is fed back to the numerical control system and this position is compared to what the position should be if the article was perfectly manufactured and any deviation printed out, and in a manner hereinbefore described. The same procedure is followed to determine measurements in the Y and Z axes.

Figure 1:
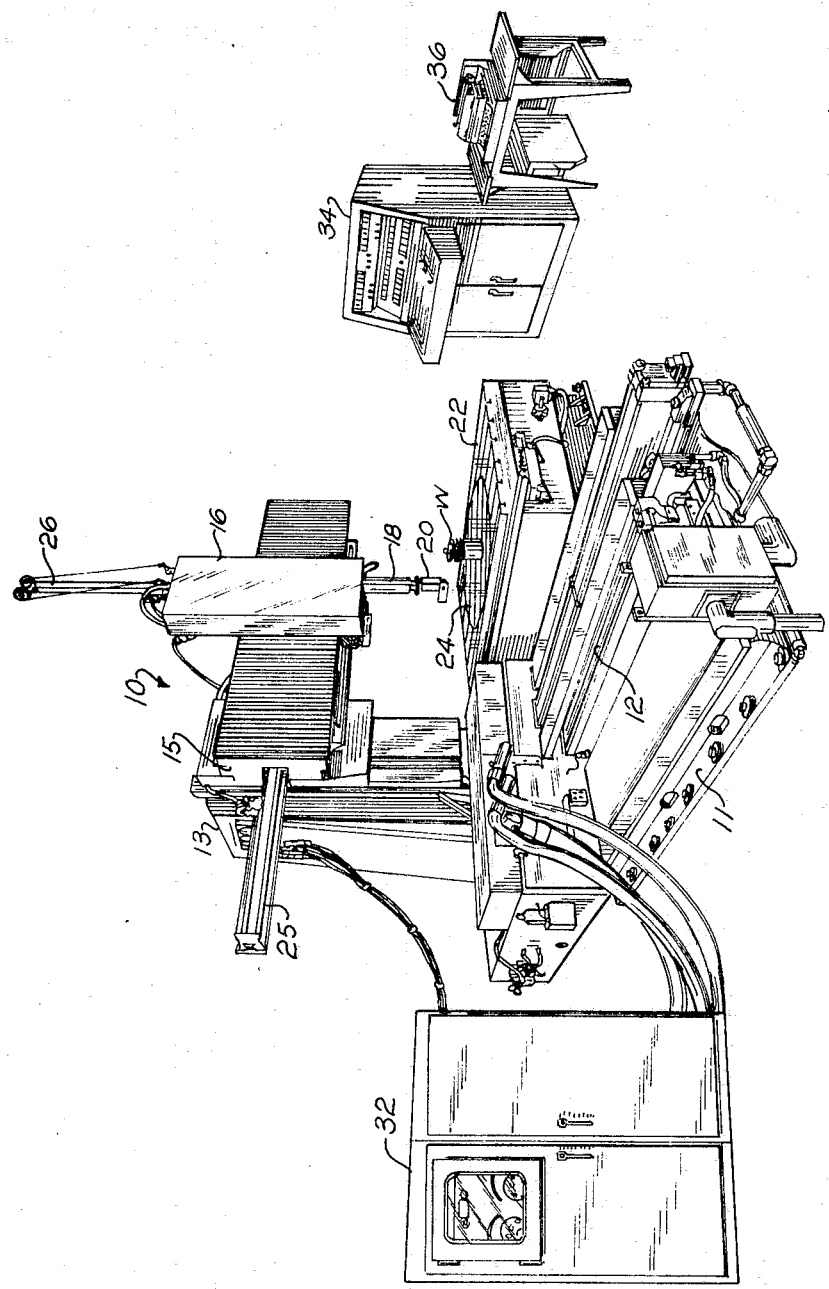
FIG. 1 is a perspective view of an inspection and measuring apparatus embodying the present invention with an articles of manufacture supported on a work table.
Figure 2:
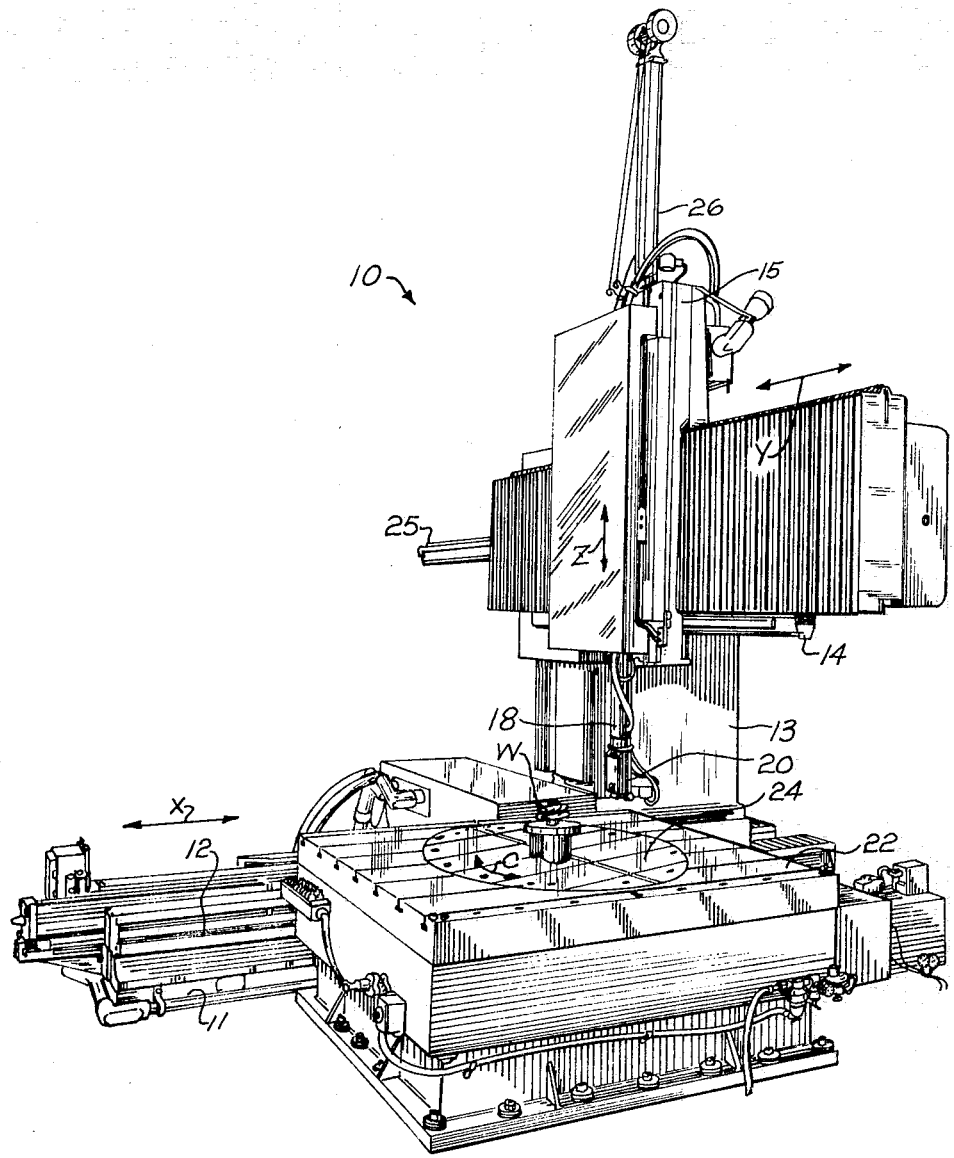
FIG. 2 is a perspective view on a larger scale and from the opposite side of a portion of the apparatus shown in FIG. 1.

In many cases it is necessary to measure a spiral or a circular path, for example the article 14 shown in FIG. 2 is an impeller and the blades thereof describe a spiral path, and thus, it is necessary to move the probe in such a path around the article. The attitudes shown in FIG. 12b through 12e constitute the various positions for the probe head 12 relative to a plurality of nominal points for measuring such an article. After positioning the probe head 12 to a nominal point as shown in FIGS. 12b through 12e, the probe head 20 can then be moved along the Z axis.

The probe head 12 can be used for probing an article of any shape. As a further example, the precise center of a hole can be located by automatically positioning the probe along two axes to the nominal center of a hole. The true center can then be obtained by manually moving the probe along two intersecting chords of a circle, i.e. along the two axes, to thereby determine the actual coordinates of the hole's rim. This information can be used by the computer or numerical control director to obtain the precise center of the hole and thus, the computer can determine the deviation from the nominal.

The provision of a probe 57 which is movable or pivotal relative to the probe head 20 provides for an increased accuracy in the measurements of the article and prevents breakage of the probe 57 when the latter engages the article. Increased accuracy in the measurements is afforded because the operator does not have to accurately gauge when the probe 57 contacts the article, as would be the case if the probe was rigidly secured to the probe head, but can slowly continue movement of the probe 57 until a null position is reached. When a null position is reached, the probe 57 is accurately aligned in a predetermined position relative to the probe head 20 and has a predetermined pressure contact with the article being measured. Breakage of the probe 57 is prevented under normal conditions of operation because the probe 57 will deflect relative to the probe head 20 upon engagement with the article.

Although a specific embodiment of a probe head to be used with numerical controlled machinery has been described, applicant does not intend to be limited thereby. Obviously modifications can be made in the mechanical features of construction and in the materials used. The essential characteristics of the device described heretofore are that it is mated to a numerical control system and is capable of being moved in three axes by directional information and then be manually probed in a fourth axis. Thus as will be recognized by those skilled in the art, devices other than the specific piston block construction and rack and pinion gearing arrangement may be utilized to orient the head 20 in the various attitudes shown. Likewise, different mechanical features may be utilized to swing the breakaway portion of the probe head 20 90° to produce the attitudes shown in FIGS. 12b through 12e.

What I claim is:
1. An inspection tool operatively mounted on a numerically-controlled machine comprising:
   a first support member rigidly mounted on said machine, said member having a generally rectangular configuration;
   a second support member journaled for rotation within said first support member about an axis transversely oriented relative to said first member; said second support member being provided with a centrally disposed longitudinally extending cylindrical bore;
   an electrical signal generator including an operating arm;
   means for mounting and supporting said generator within said bore, said means being rotatably supported within said bore by said second support member;
   power means supported by said second support member and operatively connected to said means for mounting and supporting said generator for rotating said last named means about an axis longitudinally oriented relative to said cylindrical bore;
   a probe assembly including a probing member;
   yoke means mounted within the cylindrical bore of said second support member for supporting said probe assembly for rotary movement and for operating said signal generator by transmitting motion of said probe assembly to the operating arm of said signal generator; and
   means mounted for rotary movement in said bore about an axis longitudinally oriented relative to said bore, and keyed to said means for mounting and supporting said generator for supporting said yoke means for rotary motion about an axis transversely oriented relative to said bore.

2. An inspection tool for use with a numerically-controlled machine comprising a work support and a tool carrier movable relative to one another in opposite directions along linear paths at right angles to one another, said tool comprising: a first member adapted to be rigidly mounted on the tool carrier of the machine; a second member rotatably supported by said first member for angular movement about a first axis; a third member rotatably supported by said second member for angular movement about a second axis at right angles to said first axis; a hydraulically-powered piston supported by said second member; means for operatively connecting said piston to said third member such that movement of said piston rotates said third member; electric switch means supported by said second member and operated by said piston for controlling the energization of said piston; said switch means being adapated to be electrically connected to a numerical control for indicating the operative position of said piston; a signal generator supported by said third member, said signal generator being adapted to be electrically connected to the numerical control; a probe member rotatably supported by said third member for angular movement about a third axis at right angles to said first axis; and means operatively connecting said probe member and said signal generator such that movement of said probe member relative to said third member causes said signal generator to produce an electrical analog of such movement.

3. An inspection tool for use with a numerically-controlled machine comprising a work support and a tool carrier movable relative to one another in opposite directions along linear paths at right angles to one another, said tool comprising: a first assembly adapted to be rigidly mounted on the tool carrier of the machine; a second assembly rotatably supported by said first assembly for angular movement about a first axis; a third assembly rotatably supported by said second assembly for angular movement about a second axis at right angles to said first axis; a hydraulically-powered piston forming a part of said second assembly; means for operatively connecting said piston to said third assembly such that movement of said piston rotates said third assembly; electric switch means forming a part of said second assembly and operated by said piston for controlling the energization of said piston; said switch means being adapted to be connected to a numerical control for indicating the operative position of said piston; a signal generator forming a part of said third assembly, said signal generator being adapted to be electrically-connected to the numerical control; a probe member rotatably supported by said third assembly for angular movement about a third axis at right angle to said first axis; means operatively connecting said probe member and said signal generator such that movement of said probe member relative to said third assembly causes said signal generator to produce an electrical analog of such movement; and means operatively associated with said third assembly and said probe member for biasing said probe member to an initial position relative to said third assembly.

References Cited

UNITED STATES PATENTS

| | | |
|---|---|---|
| 2,835,042 | 5/1958 | Tandler et al. |
| 3,164,909 | 1/1965 | Rosenberg. |
| 3,226,833 | 1/1966 | Lemelson. |
| 3,250,012 | 5/1966 | Hilton et al. |

OTHER REFERENCES

Article by W. M. Stocker, Jr., "American Machinist," Feb. 9, 1959, pp. 101–103.

SAMUEL S. MATTHEWS, Primary Examiner